United States Patent

Morgan

[15] 3,684,216
[45] Aug. 15, 1972

[54] VARIABLE GEOMETRY AIRCRAFT

[72] Inventor: Everett L. Morgan, 675 La Casa Via, Walnut Creek, Calif. 94598

[22] Filed: Aug. 6, 1970

[21] Appl. No.: 61,722

[52] U.S. Cl. ................................... 244/13, 244/36
[51] Int. Cl. ............................................. B64c 3/38
[58] Field of Search ........ 244/13, 36, 49, 12, 48, 123, 244/89

[56] References Cited

UNITED STATES PATENTS

| | | | |
|---|---|---|---|
| 2,681,773 | 6/1954 | Rethorst | 244/36 |
| 1,855,012 | 4/1932 | Dill | 244/49 |
| 2,685,420 | 8/1954 | Burnelli et al. | 244/36 |
| 3,049,320 | 8/1962 | Fletcher | 244/12 A |
| 3,134,560 | 5/1964 | Halsmer | 244/49 |
| 3,307,807 | 3/1967 | Stoppe | 244/48 |
| 3,473,761 | 10/1969 | Chutter | 244/123 |

*Primary Examiner*—Milton Buchler
*Assistant Examiner*—Carl A. Rutledge
*Attorney*—Joseph B. Gardner

[57] ABSTRACT

A structurally simple aircraft formed to a considerable extent of rectilinear elements and capable of low velocity takeoffs and landings in short distances. The aircraft has unique control and lift wing components that are adjustably positionable to selectively vary the flight characteristics of the aircraft.

3 Claims, 6 Drawing Figures

PATENTED AUG 15 1972 3,684,216

INVENTOR:
EVERETT L. MORGAN
BY:
ATTORNEY

VARIABLE GEOMETRY AIRCRAFT

The present invention pertains to an aircraft and, more particularly, to a structurally simple aircraft capable of short takeoffs and landings at low velocities.

There is an ever increasing need for an aircraft of the fixed wing type (i.e., the term "fixed wing" being used in its conventional sense in contradistinction to rotary wing aircraft or helicopters) capable of landing on and of becoming airborne from short fields at low velocities. Consideration of aircraft having such desirable characteristics has reached the point that the general class thereof has become known as STOL (short takeoff and landing) aircraft, yet despite the need and attention aircraft of this type has received, so far as is known, no single craft thus far developed has proven satisfactory. It will be apparent that a relatively inexpensive aircraft of simple construction having such takeoff and landing characteristics would be a very significant contribution to the aircraft art.

In view of the foregoing, a general object of the present invention is to provide an improved STOL aircraft of economic and simplified construction.

Additional objects, among others, of the invention are in the provision of an aircraft of the character described having adjustable main or lift wings selectively positionable between a fully extended orientation used during takeoffs and landings and at low air speeds that approach a hovering mode, and a fully retracted orientation used at cruising velocities; having a shroud with airfoil characteristics enclosing the propeller of the craft so as to provide increased lift therefor; having cabin components with airfoil configurations so that lift is derived therefrom whenever the aircraft is in flight; having horizontal stabilizer components selectively movable between extended and retracted positions and angularly adjustable in any such position thereof so as to regulatively adjust the drag and lift of the aircraft especially during takeoffs and landings and to direct air over the elevator surfaces and along the rudder surfaces especially at low air speeds so as to increase the control response of the elevator especially at low flight velocities; having aerodynamically counterbalanced rudder and other control elements so that the requirement for counterbalancing weights incorporated therein is reduced; and having a simplified structural design in which certain major structural components are of rectilinear configuration.

Additional objects and advantages of the invention, especially as concerns particular features and details thereof, will become apparent as the specification continues.

An embodiment of the invention is illustrated in the accompanying drawing, in which.

Figure 6:
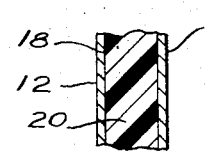
FIG. 6 is a broken transverse sectional view, taken on the line 6—6 of FIG. 4, showing the construction of the side members of the aircraft.

As shown in the drawing, the aircraft comprises a forward portion or cabin 10 on opposite sides of which are mounted rearwardly extending tail booms or side members 12 and 14. The side members 12 and 14 are substantially planar components that may be made of any suitable material which is lightweight and strong. However, the preferred construction is best illustrated in FIG. 6 as comprising an outer skin, which may be formed in part by thin metal side walls 16 and 18, within which is confined a core 20 of polyurethane foam providing both stiffness and strength. This material is also quite fire resistant. The booms are secured to the sides of the cabin 10 in any suitable manner well known in the art of aircraft construction.

The bottom wall 22 of the cabin extends substantially the full width between the side members 12 and 14. This bottom wall or surface 22 in conjunction with the air flow characterics of the upper surfaces of the cabin will sustain flight of the aircraft at normal cruising speed without having to depend upon lift from the forward lift wing of the aircraft which includes a pair of short wings 24 and 26 located on opposite sides of the aircraft and described in further detail hereinafter.

Figure 4:
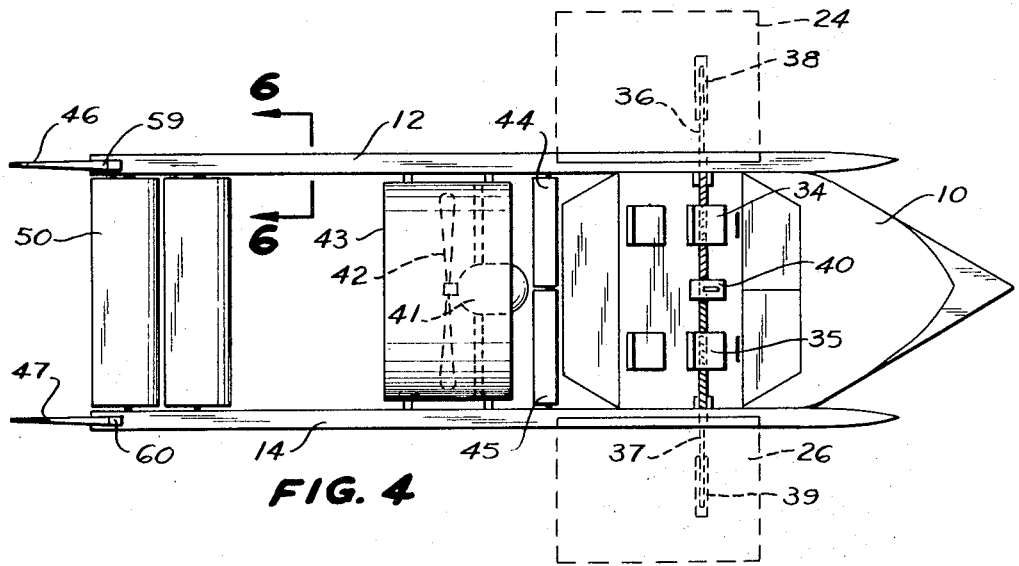
FIG. 4 is a top plan view of the aircraft in which the unfolded position of the forward lift wings are illustrated in broken lines.

The wings 24 and 26 are each hingedly mounted near the lower edge of the respectively associated side members 12 and 14. Respectively disposed above the lift wings 24 and 26 are stub wings 28 and 30, best shown in FIG. 5, each of which is hingedly secured at its inner base and to the associated side member above the hinged connection thereto of the associated lift wing. Short connecting rods 31 and 32 are hingedly connected at the opposite ends thereof between the respective pairs of stub wings and underlying lift wings to force the same to swing or pivot concurrently between the folded and extended positions respectively shown in FIGS. 4 and 5.

A threaded actuating rod 33 is mounted within the cabin 10, and the opposite ends of the rod are connected by universal joints at boxes 34 and 35 to drive screws 36 and 37 extending outwardly from the cabin into engagement with threaded nuts 38 and 39 hingedly mounted within the respective stub wings 28 and 30. The midportion of the actuating rod 33 is engaged with a source of motive power such as reversible electric motor 40 disposed within the cabin 10. Energization of the motor 40 as controlled by a pilot will cause rotation of the rod 33 in the appropriate angular direction to fold the stub wings and lift wings upwardly and inwardly or to unfold the same into their extended positions.

For low speed flight such as on take off or landing, the wings 24 and 26 should be placed in the generally horizontal or lowered position for aiding lift of the entire aircraft. When normal cruising speed is reached, or nearly so, the wings are raised to their vertical position, thereby reducing drag and permitting the lift developed because of the airfoil configuration of the cabin 10 and bottom wall 22 thereof to provide and maintain the necessary lift forces on the aircraft.

At the rear of the cabin 10 is mounted the prime motive source, typically a gas turbine or other internal combustion engine 41.

An air screw or propeller 42 is secured to the output shaft of the engine 41 to push against air when the engine is operating. A cylindrical shroud 43 surrounds the propeller 42, it having been found that a shroud placed about the propeller of an aircraft provides additional lift therefor. This is of substantial benefit when landing and taking off at low speeds especially on short runways.

Control surface member (i.e., ailerons) 44 and 45 are included between the rear of the cabin 10 and the front of the shroud 40 to enable the pilot to bank the aircraft during turning thereof irrespective of whether the wings are folded upwardly into their retracted vertical positions or are extended.

At the aft or rear ends of the booms or side members 12 and 14 are rudders 46 and 47, respectively, mounted for pivotal displacements about generally vertical axes. It will be understood that control cables or other actuating devices (hydraulic or electric, for example) are included to operate the ailerons 44 and 45 and rudders 46 and 47 under command of a pilot situated in the cabin 10.

An elevator 50 is pivotally supported intermediate the booms 12 and 14 adjacent the rear end portions thereof for angular displacements about a transverse axis. The elevator 50 functions in a conventional manner to control climb and descent of the aircraft, and control cables or other devices are operatively connected therewith to permit the attitude thereof to be controlled from the pilots station.

Figure 1:
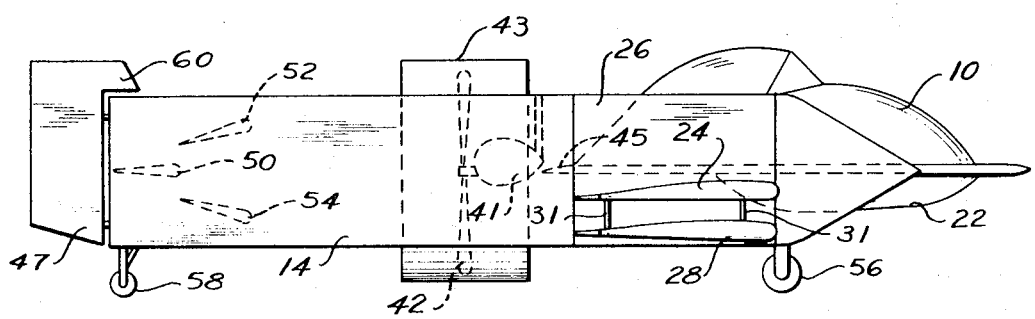
FIG. 1 is a side view in elevation of an aircraft according to the present invention.
Figure 2:
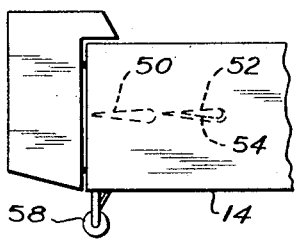
FIG. 2 is a partial side view in elevation of the aft portion of the aircraft of FIG. 1 showing one operational position of the stabilizers.
Figure 3:
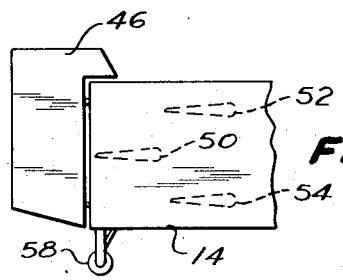
FIG. 3 is another partial side view of the aft portion similar to that of FIG. 2 showing another operational position of the stabilizers.

A plurality of horizontal stabilizers 52 and 54 are located between the side members 12 and 14 just forwardly of the elevator 50. The stabilizers 52 and 54 are mounted so that they may be vertically moved toward and away from each other between the positions respectively shown in FIGS. 2 and 3, and they are also supported for angular displacements about generally horizontal axes, as shown in FIGS. 1 and 3. Suitable mechanism, such as rack and gear and control means, is included in operative connection with the stabilizers to control the same. By positioning the two stabilizers closer together and by angling the same toward rearward convergence, the blast of air from the propeller 42 may more fully be directed toward the elevator 50 to improve control response thereof at relatively slow speeds. Further, braking and drag effects may be varied by changing the relative positions and inclinations of the stabilizers.

It may be noted that by retracting the wings 24 and 26 into the vertical positions thereof, as above described, the aircraft can be driven along a roadway of standard width provided that the overall width of the aircraft is otherwise accommodated thereby, a maximum width of about eight feet usually being the legal limit. For purposes of safety during road travel, the shroud 43 at the entrance and exit ends thereof can be covered by protective screening to isolate the propeller 42. The forward wheels 56 are advantageously turnable to facilitate manipulation of the craft when on the ground and rear wheels 58 are included at the rear or aft section of the craft to support the same.

A typical embodiment of the invention constitutes an aircraft having an overall length of the order of 30 feet, a width approximating 8 feet, and a gross weight of about 2,100 pounds (including the engine which weighs slightly in excess of 800 pounds). The engine develops about 300 horse power which enables the aircraft to cruise at a speed of about 350 miles per hour. The distance required for takeoff is about 50 feet, and the ground velocity for takeoff and landing is approximately 10 miles per hour.

The span of the lift wings 24 and 26 may vary considerably, but in the exemplary embodiment of the aircraft set forth, the span of each wing is about four feet from tip to root or base thereof, thereby enabling it to retract completely into a large recess provided therefor in the associated boom 12 or 14. The height of each boom 12 and 14 will be about four feet in order to accommodate such retraction. Complete retraction of the wings into the plane of the flat booms 12 and 14 considerably reduces drag during cruising modes of the aircraft. It will be appreciated, however, that the wings 24 and 26 may be considerably longer and in such case, will project above the upper edges of the respectively associated booms 12 and 14 when retracted. The fuel tanks of the aircraft are advantageously disposed within the booms 12 and 14, thereby enabling the cabin 10 to be used for passenger and pilot comfort, as well as for storage of baggage and other items. If necessary because of the fuel loads carried, the booms 12 and 14 may be strengthened by reinforcing ribs located within the interiors thereof.

The tare weight of the aircraft is reduced because the requirement for counterbalancing weights in the rudders 46 and 47 and in other of the control surface members is minimized as a result of their being hinged intermediate the ends thereof so that areas of each control surface are disposed on either side of the pivotal axis therefor. This constructional characteristic permits a better distribution of the wind loads along the control surfaces. For example, each rudder 46 and 47 has a forwardly extending tab 59 and 60, respectively, disposed along one side of the generally vertical hinge axis of the associated rudder. Thus, the wind loads acting on these tabs facilitates turning of the rudders and permits minimization of the requirement for counterbalancing weights. This same arrangement applies to the ailerons 44 and 45, elevator 50, and horizontal stabilizers 52 and 54 because they are pivoted or hinged adjacent the centers thereof.

The booms 12 and 14 are flat, relatively narrow components having no complex arcuate shapes which makes construction thereof simple and inexpensive. The lift wings 24 and 26, stub wings 28 and 30, shroud 43 at the upper and lower extremities thereof and the cabin or cockpit 10 and especially the wide center panel thereof defined by the bottom wall 22 have the usual airfoil configurations to provide lift as a consequence of the velocity differential along the upper and lower surfaces of each such airfoil. The lift defined by the wings 24 and 26 together with the stub wings 28 and 30 respectively associated therewith is used during takeoffs and landings of the aircraft as well as at low air speeds which may approximate hovering modes. As air speed is increased, the lift wings may be folded inwardly to any appropriate angle, and may be completely retracted into the full-line positions shown in FIG. 4 as the aircraft approaches cruising velocity, thereby relying on the lift provided by the cabin 10 and shroud 43 to sustain flight. The horizontal stabilizers 52 and 54 are ordinarily moved inwardly into the retracted positions thereof illustrated in FIG. 2 in which the two stabilizers are positionally juxtaposed. The angular disposition of these stabilizers may be varied slightly at this time in order to trim the aircraft for horizontal flight. During takeoff and landing, the stabilizers 52 and 54 may be spread apart, as illustrated in FIGS. 1 and 3, and tilted or pivoted inwardly, as shown in FIG. 1, to increase drag and lift and also to direct an air stream over the control surfaces of the elevator 50 to enable it to provide greater control response. Upon landing, the stabilizers 52 and 54 may be pivoted inwardly to a considerable extent to increase the breaking action defined thereby, in which case the stabilizers function in a manner analogous to a landing chute to quickly reduce forward motion of the aircraft.

Figure 5:
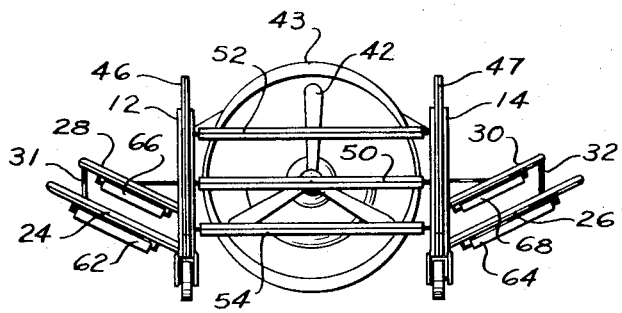
FIG. 5 is a rear view in elevation of the aircraft showing the forward lift wings in an extended position.

For purpose of further increasing the lift imparted to the aircraft during landings and takeoffs and at low air speeds, the main lift wings 24 and 26 and auxiliary or stub wings 28 and 30 may be respectively provided with flaps 62, 64, 66 and 68 which are selectively movable between retracted positions (not shown) in which they are confined within the wing surfaces and extended positions, one of which is shown in FIG. 5 in which each of the flaps projects downwardly and rewardly from the respectively associated lower surfaces of the wing members. However, the lower flaps 62 and 64 are movable upwardly toward the auxiliary wings 28 and 30 so that the upper and lower flaps cooperate much in the manner of the horizontal stabilizers 52 and 54 to control air flow between the main and auxiliary wings and thereby alter drag and lift imparted thereby to the aircraft.

While of the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. An aircraft, comprising: a fuselage having a cabin providing a pilot station therein; propulsion means for said aircraft operative to propel the same in flight; a lift wing structure including a pair of main lift wings respectively mounted on each side of said aircraft, a plurality of control members including rudder, elevator, aileron and horizontal stabilizer structure, manipulation of which effects control of said aircraft; said lift wing structure further including a pair of auxiliary lift wings respectively mounted on each side of said aircraft in spaced relation above the associated main lift wings; each pair of said auxiliary wings being pivotally supported adjacent said fuselage for swinging movement about an axis parallel to the longitudinal axis of said fuselage and between extended positions in which each of said auxiliary lift wings extends transversely from said fuselage and retracted positions in which said auxiliary wings have a generally vertical orientation and are in substantially contiguous relation with said fuselage; and mechanism for selectively displacing said auxiliary lift wings between the extended and retracted positions thereof; said auxiliary lift wings of each pair being in opposed relation and in intimate proximity with each other so as to provide air braking of said craft in forward flight thereof.

2. The aircraft of claim 1 in which the auxiliary lift wings in each pair thereof are interconnected so as to move concurrently between the extended and retracted positions thereof.

3. An aircraft comprising: a fuselage having a pilot station therein; propulsion means for said aircraft operative to propel the same in flight; a lift wing structure including a pair of pivoted lift wings mounted on the sides of said aircraft; a plurality of control members including a rudder, elevator, aileron, and stabilizer structure manipulation of which effects control of said aircraft; said stabilizer structure including a pair of stabilizers forwardly of and arranged for cooperation with said elevator and supported adjacent the tail for bodily displacements as a whole in generally vertical directions toward and away from each other between a retracted position in which they are in substantial juxtaposition in general longitudinal alignment with said elevator, and spaced apart relation during low flight velocities, each of said stabilizers also being supported for pivotal displacements about an axis generally transverse to that of the longitudinal axis of the craft so as to vary the freedom of air flow therebetween to change the drag characteristics of the aircraft and direct air forced rearwardly by said propeller into intimate relation with said elevator to augment the control response at low flight velocities.

* * * * *